US009569221B1

(12) United States Patent
Chaudhri et al.

(10) Patent No.: US 9,569,221 B1
(45) Date of Patent: Feb. 14, 2017

(54) DYNAMIC SELECTION OF HARDWARE PROCESSORS FOR STREAM PROCESSING

(71) Applicant: Amazon Technologies, Inc., Seattle, WA (US)

(72) Inventors: Apoorv Chaudhri, Sunnyvale, CA (US); Enrica Maria Filippi, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 14/500,751

(22) Filed: Sep. 29, 2014

(51) Int. Cl.
| | |
|---|---|
| *G06F 9/46* | (2006.01) |
| *G06F 9/38* | (2006.01) |
| *G06F 1/32* | (2006.01) |
| *G06T 1/20* | (2006.01) |
| *H04N 19/436* | (2014.01) |

(52) U.S. Cl.
CPC ........... *G06F 9/3851* (2013.01); *G06F 1/3293* (2013.01); *G06F 9/3867* (2013.01); *G06T 1/20* (2013.01); *G06T 2207/10016* (2013.01); *H04N 19/436* (2014.11); *Y02B 60/142* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 7,961,194 | B2 * | 6/2011 | Bakalash | G06F 9/5044 345/502 |
| 8,112,250 | B2 * | 2/2012 | Floyd | G06F 1/3203 702/182 |
| 8,479,031 | B2 * | 7/2013 | Gao | G06F 1/3203 713/323 |
| 8,610,727 | B1 * | 12/2013 | Bao | G06F 9/5044 345/502 |
| 9,372,720 | B2 * | 6/2016 | Jung | G06F 9/4843 |
| 2002/0062454 | A1 * | 5/2002 | Fung | G06F 1/3203 713/300 |
| 2005/0262510 | A1 * | 11/2005 | Parameswaran | G06F 15/7842 718/105 |
| 2007/0260895 | A1 * | 11/2007 | Aguilar, Jr. | G06F 1/206 713/300 |
| 2009/0164812 | A1 * | 6/2009 | Capps, Jr. | G06F 1/3203 713/320 |

(Continued)

OTHER PUBLICATIONS

Hubert et al, Profiling-Based Hardware/Software Co-Exploration for the Design of Video Coding Architectures, 2009, IEEE Transactions on Circuits and Systems for Video Technology, vol. 19, No. 11, pp. 1680-1691.*

(Continued)

*Primary Examiner* — Abu Ghaffari
(74) *Attorney, Agent, or Firm* — Lee & Hayes, PLLC

(57) ABSTRACT

A computing platform supports stream processing pipelines, each of which comprises a sequence of stream processing tools. Upon specification of a stream processing pipeline, multiple available hardware processors are evaluated to determine which of the processor is capable of executing each tool of the pipeline while satisfying specified performance goals. Among these processors, a hardware processor is selected for each pipeline tool that will minimize power consumption.

20 Claims, 4 Drawing Sheets

(56) References Cited

U.S. PATENT DOCUMENTS

| | | | |
|---|---|---|---|
| 2011/0296149 A1* | 12/2011 | Carter | G06F 1/3203 712/229 |
| 2012/0166834 A1* | 6/2012 | Boss | G06F 1/28 713/320 |
| 2012/0271481 A1* | 10/2012 | Anderson | G06F 1/206 700/299 |
| 2012/0303932 A1* | 11/2012 | Farabet | G06F 15/7867 712/30 |
| 2013/0145203 A1* | 6/2013 | Fawcett | G06F 9/5061 714/3 |
| 2014/0013139 A1* | 1/2014 | Kimura | G06F 1/3209 713/323 |
| 2014/0055347 A1* | 2/2014 | Taylor | G06F 9/5044 345/156 |
| 2014/0063025 A1* | 3/2014 | Krig | G06T 1/20 345/506 |

OTHER PUBLICATIONS

"Open VX. Hardware acceleration API for Computer Vision applications and libraries", retrieved from khronos.org/openvx on Jul. 30, 2014, Khronos Group, 2014, 3 pages.

* cited by examiner

DYNAMIC SELECTION OF HARDWARE PROCESSORS FOR STREAM PROCESSING

BACKGROUND

The use of complex software algorithms to improve the experiences of device users places increasing demands on the computing capabilities of such devices. Complex algorithms may be used for computer vision, three-dimensional displays, programmable cameras, high definition video and audio, and so forth. Main CPUs, even in multiple core configurations, are hard pressed to meet the demands of these algorithms because of thermal and power limitations.

One increasingly popular response to this problem is to provide distributed auxiliary computing resources that can provide special purpose capabilities that demonstrate higher performance and lower power consumption. Such auxiliary resources may include graphics processing units (GPUs), digital signal processors (DSPs), single instruction, multiple data (SIMD) extensions, and other "helper" cores such as special purpose accelerators.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
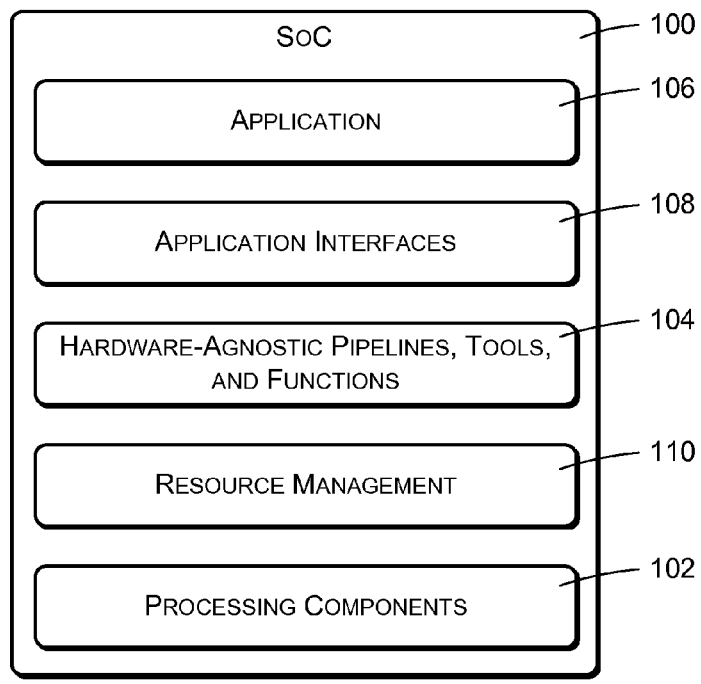
FIG. 1 is a block diagram of an example system-on-chip (SoC) that may be configured to perform dynamic selection of hardware processors for stream processing tools.

Mobile, battery-operated devices are increasingly called upon to perform highly complex and computationally intensive tasks relating to image, graphics, and audio processing. Tasks such as these typically involve processing continuous and/or intermittent streams of data such as audio, video, and other related data.

In addition to increasingly faster processor clock speeds, the use of which has reached a point of diminishing returns, many system-on-chip (SoC) architectures utilize different types of hardware processors addition to a main central processing unit (CPU). For example, SoCs may utilize multiple general-purpose central-processing units (CPUs), CPU cores, core extensions such as single instruction multiple data (SIMD) extensions, graphic processing units (GPUs), and digital signal processors (DSPs), as well as other on-chip or off-chip vector and stream processors. Systems and system architectures such as these, which use a variety of different types of hardware processors, may be referred to as heterogeneous parallel computing systems.

In certain embodiments described herein, an SoC has multiple hardware processors and associated low-level software drivers or kernels that support the hardware processors. The SoC may also have one or more libraries of low-level software functions that may be called upon to perform specialized functions relating to graphics processing, graphic and video rendering, audio processing, and so forth.

At a yet higher level of abstraction, the SoC may provide stream processing tools for performing high level algorithms with respect to data streams. In a vision processing environment, for example, stream processing tools may be provided for such things as color conversion; blurring; corner detection; image segmentation; edge detection; object detection, recognition, and tracking; stereoscopic image analysis; three-dimensional shape analysis; and so forth.

In order to perform complex tasks that require sequences of analytical and processing operations, stream processing tools may be logically arranged in sequences referred to as processing pipelines or tool chains. A processing pipeline accepts a data stream such as a video stream, analyzes the data stream using a sequence of individual tools, and returns a result. More specifically, the first tool of the pipeline may receive an input image of a video stream and may process the input image to produce an output image. The output image is provided as an input image to a subsequent tool in the pipeline. Images or other data are passed in this manner through multiple processing tools to produce a desired pipeline output data stream.

The SoC may provide libraries of stream processing tools for use by applications. The SoC may also provide software interfaces that applications can use to specify and create pipelines. The created pipelines may use the stream processing tools of the SoC libraries or may use stream processing tools provided by the application.

The SoC may also provide a library of preconfigured pipelines, which use the provided stream processing tools to implement various types of tasks. The application may provide software interfaces that applications can use to set up and initiate preconfigured pipelines and/or pipelines constructed by the application itself.

An application that is to be executed by the SoC may be written and provided in high-level or intermediate-level programming languages, without hardware dependencies and without dependencies on the lower-level software components of the SoC. Instead, the application may specify a processing pipeline comprising multiple stream processing tools that are provided by the SoC. At runtime, the SoC may evaluate the current operating environment and conditions, and select one of multiple available hardware processors to execute each of the stream processing tools. The selection of a particular hardware processor to execute a particular stream processing tool may be based on a variety of information, including information provided by the application itself. For example, the application may indicate maximum desired or allowable latencies for a pipeline and/or for individual tools of the pipeline, and the SoC may select a hardware processor that can provide latencies at or lower than the indicated maximum latencies. When selecting a hardware processor, the SoC may also consider power consumption, and may select one of the hardware processors that minimizes power consumption while still maintaining within the expected latencies of the pipeline.

The SoC may also assign processing tools to different hardware processors based on characteristics of the hardware processors and current operating conditions. For example, the SoC may be configured with information regarding power vs. performance characteristics of the individual hardware processors, and may select processors to achieve desired power usage and performance goals. The SoC may also look at current loads of the processors, and may select a processor having available capacities that are sufficient to achieve desired performance goals for a pipeline or a processing tool.

FIG. 1 shows an example SoC 100 that supports dynamic assignment of pipeline components to different hardware processors. The SoC 100 may have multiple processing components 102, which may comprise hardware processors, kernels and drivers, functions, algorithms, etc. The processing components 102 may be used to execute applications and/or to perform functions in response to instructions, programs, or commands. Hardware processors may comprise CPUs, CPU cores, GPUs, DSPs, on-chip and/or off-chip co-processors, vector processors, and other components that perform computations on received data based on software such as programs, instructions and/or other configuration data. Kernels and drivers may comprise device-dependent software or firmware that provide access to the hardware processors as well as to other hardware devices. The processing components 102 may include functions and algorithms that call or utilize the kernels and drivers and that are executed by the hardware processors. The functions and algorithms may be configured for execution by different hardware processors. For example, a particular function may be provided in a different version for each of multiple hardware processors, particularly where hardware processors are programmable using different programming languages.

The SoC provides a set of high-level, hardware-agnostic components 104 that may be called by an application 106 using application interfaces 108 to perform various high-level computing tasks. The interfaces 108 may be referred to herein as application programming interfaces (APIs) or simply as interfaces or high-level software interfaces.

The components 104 may comprise a library of functions, stream processing tools, and stream processing pipelines that may be invoked by the application 106. The components 104 may provide functionality relating to various types of data processing, such as graphics processing, image processing, vision processing, audio processing, graphics rendering, audio rendering, mathematical and logical operations, etc. Examples relating to vision processing may include such things as image conversion, resizing, filtering, and segmentation; edge detection; object detection and identification; object tracking; and so forth.

The application 106 may be written in a high-level language and may contain calls to the high-level software interfaces 108. The application 106 may perform specific tasks by calling the high-level interfaces 108 to invoke the functional components 104. Of particular relevance to the discussion herein, the application 106 may define and/or select processing pipelines that are subsequently executed by the SoC 100 to perform operations or tasks with respect to streams of data. A processing pipeline comprises multiple stream processing tools, also referred to as software tools, each of which comprises an operation, function, algorithm, or other executable unit of software. Each tool typically has one or more logical inputs that accept data streams such as video image streams. Each tool also has one or more logical outputs that provide processed data streams or other data. The tools of a pipeline are logically configured in a sequence so that a data stream is passed through the sequence and operated on by each of the tools.

Figure 2:
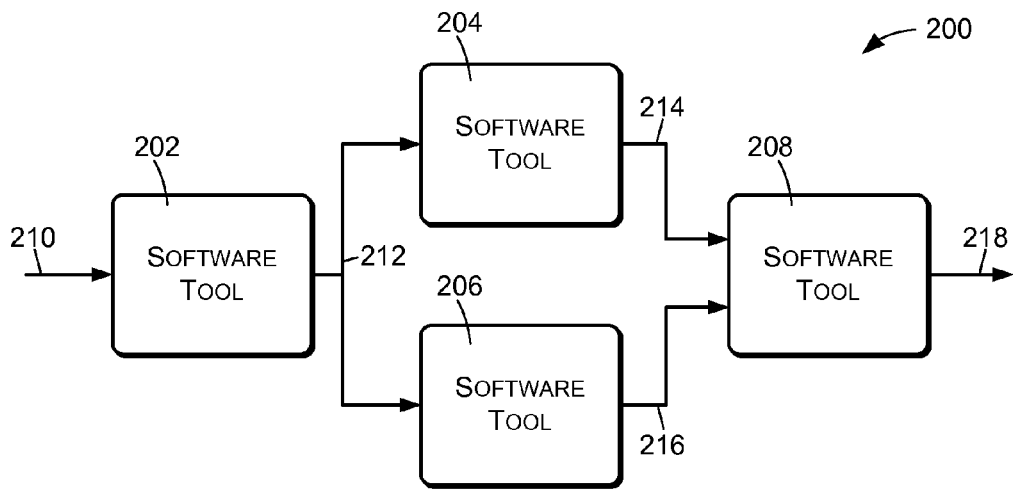
FIG. 2 is a block diagram of an example processing pipeline that may be implemented by the system of FIG. 1.

FIG. 2 shows a simple example of a processing pipeline 200. The pipeline 200 comprises multiple stream processing tools 202, 204, 206, and 208 arranged in a sequence as nodes of a graph where edges between the nodes represent data flows. Each stream processing tool may comprise a procedure or algorithm that is performed with respect to a data stream. Each stream processing tool accepts one or more input data streams and produces one or more output data streams.

In the specific example of FIG. 2, the stream processing tool 202 receives a data stream 210. As an example, the data stream 210 may be a video stream provided by a video camera. The stream processing tool 202 processes the data stream 210 and provides an output data stream 212, which is in turn provided to both the stream processing tool 204 and the stream processing tool 206. The stream processing tools 204 and 206 perform additional processing on the data stream 212 to produce respective output data streams 214 and 216, which are provided as inputs to the stream processing tool 208. The stream processing tool 208 analyzes the data streams 214 and 216 to produce an output data stream 218.

The output data stream 218 may comprise various types of data, depending on the purpose of the pipeline 200. For example, a pipeline may be designed to detect and track the face of a person in a video stream and the output data stream of the pipeline may comprise coordinates of the face. As another example, the pipeline may be designed to perform audio beamforming with respect to an audio data stream, where the pipeline has inputs from multiple microphones and produces a directional audio signal as output.

Individual stream processing tools may implement algorithms for accomplishing any desired tasks with regard to audio data streams, video data streams, and other types of data streams. The stream processing tools may also be used to produce audio and video signals for output, such as by rendering audio and video based on various types of input streams.

The SoC 100 may have a number of precompiled processing pipelines for performing common tasks. Such precompiled pipelines may be augmented by additional functionality defined by the application 106. As examples, precompiled pipelines may be provided for object recognition and tracking based on video data; for audio processing of audio signals; for rendering audio, graphics, and video; and for various other types of tasks.

Returning to FIG. 1, the SoC 100 also has a resource management framework 110, also referred to herein as a resource manager, that performs resource management, scheduling, and load balancing for processing pipelines. Generally, the application 106 is configured to configure and/or select a processing pipeline for execution. The resource management framework 110 is responsive to the specification of a processing pipeline to select appropriate processing components 102 to execute the selected or designated processing pipeline.

The resource management framework 110 may select from multiple available hardware processors for execution of a processing pipeline or of individual tools of the processing pipeline. The selection may be made dynamically, depending on conditions at runtime. For example, existing processing loads of the hardware processors may be evaluated prior to selecting a particular hardware processor to execute a specific pipeline tool. Selection from among available processing components may also be based on characteristics and requirements of the processing pipeline, such as whether the pipeline is to run continuously or intermittently; latency expectations of the pipeline; power requirements of the pipeline; computational requirements of the pipeline; existing conditions such as current processing loads of the processing components 102, etc. In some cases, the application may provide information that indicates or implies the performance or computational goals of the application, the pipeline, or the tools of the pipeline, such as allowable latencies, desired computational accuracy, etc.

In some cases, the selection of a hardware processor may be influenced by the computational requirements of the processing pipeline and/or the tools, such as whether they relate to image processing, rendering, general computation/analysis, signal processing, etc. For example, an audio analysis processing graph may be assigned to and executed by a DSP. As another example, an image processing graph may be assigned to and executed by a GPU.

Figure 3:
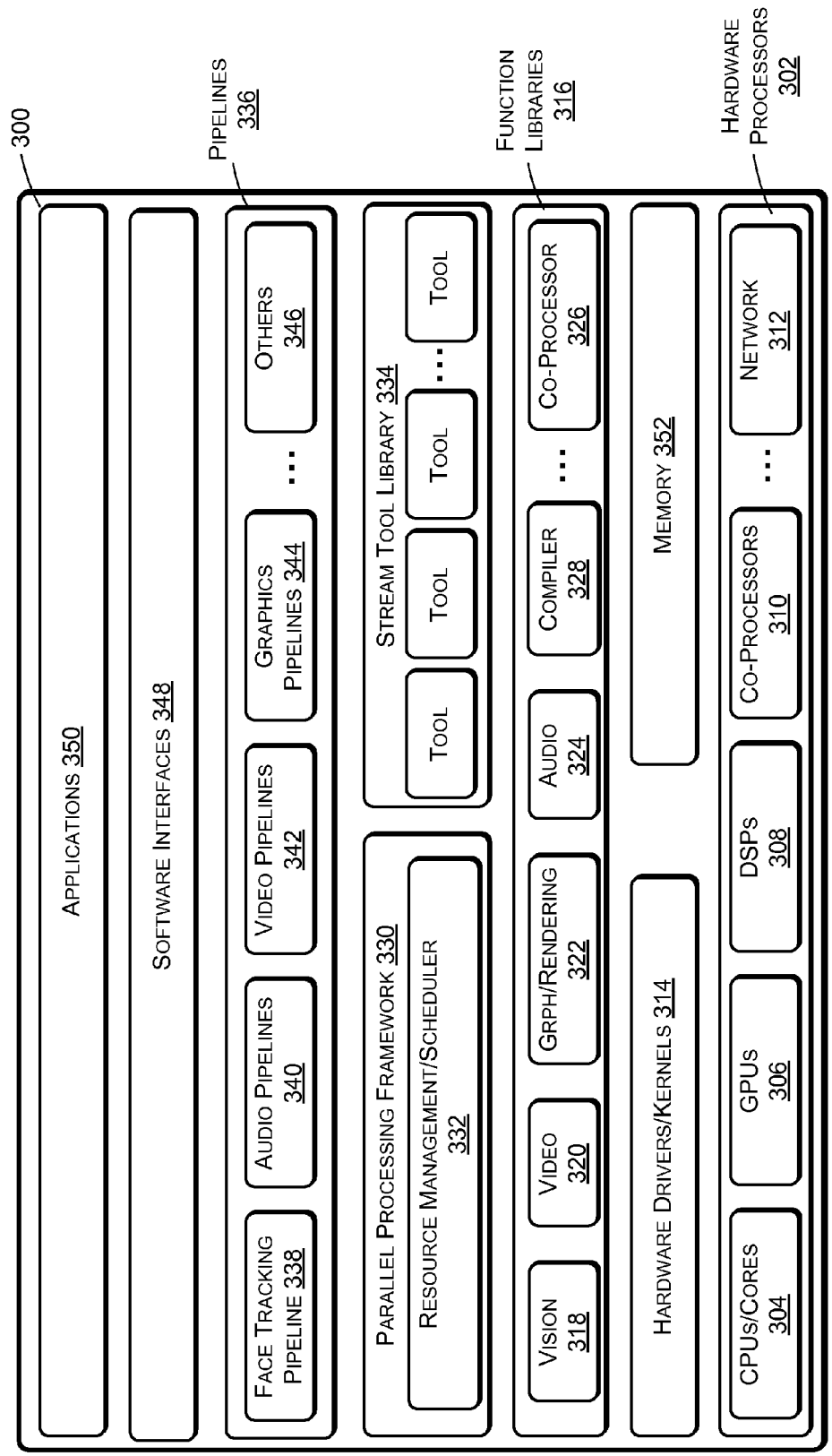
FIG. 3 is a block diagram showing example hardware and software components of an SoC or other computing platform.

FIG. 3 shows additional details in an example configuration of an SoC or other heterogeneous parallel computing platform 300. The SoC 300 includes multiple hardware processors 302, each of which is capable of executing individual processing tools of a processing pipeline. Each of the hardware processors 302 may be programmable using different techniques such as different programming languages, different instruction and/or function sets, different memory access methods, etc.

The hardware processors 302 may include one or more CPUs and/or CPU cores, one or more GPUs 306, one or more DSPs 308, one or more co-processors 310, and any of various other types of processors such as vector processors, extensions, accelerators, etc. The co-processors 310 may be on-chip or may in some cases reside off-chip. The hardware processors 302 may also include network resources 312, such as servers or other processors that are accessible through a local-area network or a wide-area network such as the Internet. The hardware processors 302 may also include other components with which the SoC can communicate, including both on-device and off-device components.

The SoC 300 also comprises multiple hardware drivers and/or kernels 314 that are accessed to utilize the hardware processors 302 and other hardware components of the SoC 300 and the device upon which it resides. The hardware kernels 314 manage access to hardware resources by software components of the SoC 300.

The SoC 300 further comprises multiple function libraries 316, each of which may include kernels, methods, routines, etc. for performing operations with respect to common types of data objects or streams. As examples, the function libraries 316 may implement vision processing functions 318, video processing functions 320, graphics and/or graphics rendering functions 322, audio processing functions 324, and so forth. The function libraries 316 may also implement co-processor functions 326 for accessing and utilizing the capabilities of any co-processors 310 of the SoC 300.

The function libraries 316 may also include a compiler 328 that may be used to compile certain functions or tools, as will be described in more detail below.

The SoC 300 may include a parallel processing framework 330 having a resource management component 332. Generally, the parallel processing framework 330 supervises execution of pipelines and pipeline tools by the hardware processors 302. As will be described in more detail below, the resource management component 332 selects which of the multiple hardware processors 302 will be used to execute individual tasks. The resource management component 332 selects from among the hardware processors 302 in order to satisfy performance goals while also minimizing power consumption.

The SoC 300 may further comprise multiple stream processing tools 334 that are be used within processing pipelines to implement corresponding processes, functions, or algorithms with respect to a data stream. The stream processing tools 334, also referred to herein as software tools 334, may include components such as graphics tools, vision tools, rendering tools, audio tools, and various other types of tools. Each stream processing tool 334 is configured to receive one or more input data streams, to process or analyze the one or more input data streams, and to produce one or more output data streams based on the processing or analysis.

The SoC 300 may also include multiple preconfigured stream processing pipelines 336, each of which comprises a sequence or arrangement of the stream processing tools 334. As a specific example, the preconfigured stream processing pipelines 336 may include a face tracking pipeline 338 that uses the vision tools 338 to perform face tracking. The face tracking pipeline 338 may accept a raw video data stream and output a data stream indicating coordinates of a detected face in the raw video data stream.

As other examples, the preconfigured stream processing pipelines 336 may include audio pipelines 340 for performing various audio tasks such as filtering, sound source localization, beamforming, text-to-speech conversion, speech synthesis, etc. The preconfigured pipelines 336 may include video pipelines 342 for performing various types of video analysis tasks such as object detection, object identification, object tracking, video rendering, shape analysis, and so forth. The preconfigured pipelines 336 may include graphics pipelines 344 for analyzing and/or rendering graphics streams. The preconfigured stream processing pipelines 336 may include any other types of processing pipelines or tool chains 346 that receive and process data streams.

The SoC 300 has software interfaces 348 that are accessible by applications 350 to configure and execute the processing pipelines 336. The applications 350 comprise programs that utilize the various resources provided by the SoC to perform high-level functionality. Examples of applications include calendar applications, email applications, games, word processors, media players, and so forth. In some cases, the applications 350 may be installed by an end user of the device upon which the SoC 300 is implemented. Applications may also be pre-installed upon certain devices for execution by the resources of the SoC 300. Generally, an application 350 uses resources of the SoC 300 to perform higher levels of functionality than are natively provided by the SoC 300.

The software interfaces 348 are configured to be called by the applications 350 to configure, instantiate, and execute processing pipelines such the preconfigured pipelines 336. In addition, the software interfaces 348 provide functionality for an application to assemble, configure, instantiate, and execute custom processing pipelines that use the stream processing tools 334 provided by the SoC 300. Furthermore, in some cases the software interfaces 348 may include functionality for creating custom stream processing tools that can be used within custom processing pipelines.

Upon execution, an application 350 specifies a processing pipeline, which may comprise one of the preconfigured pipelines 346 or a custom pipeline, by providing appropriate instructions through the software interfaces 348 to the parallel processing framework 330. The resource management component 332 responds to the instructions by selecting resources of the SoC 300 to execute the tools of the specified pipeline. In particular, the resource management component 332 selects one of the hardware processors 302 to execute each of the stream processing tools of the pipeline. After selecting a hardware processor 302 to execute each tool of the specified pipeline, the parallel processor oversees execution of the tool.

In some cases, particularly in cases where the application 350 provides a custom tool for execution within a custom pipeline, the compiler 328 may be called upon to compile a stream processing tool from a high-level or intermediate-level programming language to executable code or an executable instruction sequence that is particular to the hardware processor that is selected to execute the stream processing tool. The compilation may be performed at runtime, after selecting the hardware processor that is to be used for executing the stream processing tool.

The SoC 300 may also include memory 352, which may comprise one or more non-transitory computer-readable media storing computer-executable instructions that, when executed by one or more of the hardware processors of the SoC 300, cause the one or more hardware processors to perform the acts described herein. In particular, the software and firmware elements of the SoC 300, including the application 350, may be stored by the memory 352. The memory 352 may comprise non-volatile and non-removable system memory, and may also comprise removable or portable memory such as may be used to transfer and distribute software and other data.

Figure 4:
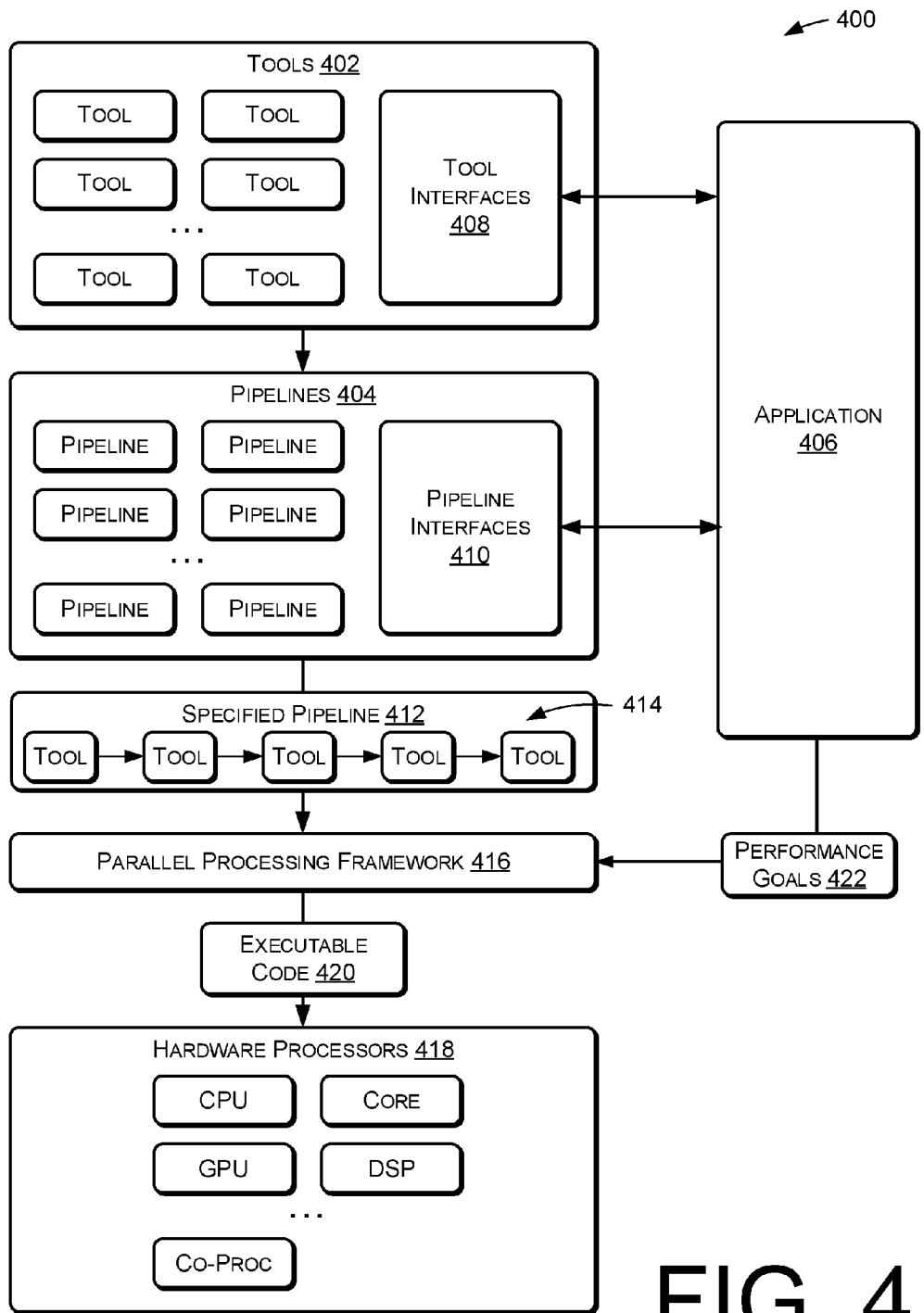
FIG. 4 is a block diagram showing logical functionality for dynamically selecting hardware processors for execution of pipeline tools in a computing platform.

FIG. 4 shows logical functionality of an example system 400 in which pipeline tools are assigned dynamically for execution by different hardware processors. In this example, the system 400 includes multiple stream processing tools 402 and multiple tool pipelines 404.

The stream processing tools 402 may include stream processing tools that are provided by the system 400 as well as other stream processing tools that are provided by an application 406. Tools may be provided at runtime by the application 406 through tool interfaces 408, which may comprise software interfaces such as are often referred to as application programming interfaces or APIs.

The pipelines 404 may include pipelines that are provided and preconfigured by the system 400, and that utilize the tools 402 that are also provided as part of the system 400. In addition, the pipelines 404 may include pipelines that are specified or defined by the application 406 and that use tools 402 that are defined by the application 406. Pipelines may be created and/or selected by the application 406 through pipeline interfaces 410, which may comprise software interfaces such as are often referred to as APIs.

In operation, the application 406 uses the tool interfaces 408 and the pipeline interfaces 410 to create and/or select a specified pipeline 412, which comprises a plurality of stream processing tools 414 specified from the available or provided tools 402. In response to specification of the pipeline 412, a parallel processing framework or resource management component 416 selects one of multiple hardware processors 418 to execute each of the pipeline tools 414.

Each of the tools 414 is provided as executable code 420 to the correspondingly selected hardware processor 418. In some cases, the parallel processing framework 416 may compile one of more of the tools 414 at runtime, to convert from a high-level or intermediate-level language provided by the application 406 to the low-level code that is executable by the particular hardware processors 418 that have been selected to execute the tools 414. In some cases, the compiling may be to an intermediate language or code used by low-level drivers associated with the hardware processors 418. In some cases, the compilation may be to an intermediate-level language that calls functions, routines, and kernels associated with a selected hardware processor.

The parallel processing framework 416 may select the hardware processor to execute a particular stream processing tool 414 based on various information, including but not limited to:

available capacities or capabilities of the hardware processors;

the priority of the specified pipeline relative to other pipelines or tasks that are being performed by the hardware processors;

the type of processing to be performed by the stream processing tool 414, such as graphics processing, rendering, audio processing, etc.;

whether the pipeline will execute for a short time or will operate continuously;

execution latencies introduced into the specified pipeline 412 due to execution of the tool 414 by each of the hardware processors;

projected power usage of each hardware processor 418 when executing the stream processing tool 414;

projected performance of the each hardware processor 418 in comparison to projected power usage of the hardware processor 418 when executing the stream processing tool 414; or latencies or delays introduced by context switching, such as by switching from rendering and compute modes in a GPU.

In some implementations, the parallel processing framework 416 may be configured to receive information from the application 406 regarding the needs or expectations of the application 406 regarding execution latency, accuracy, and/or other factors. Specifically, the application 406 may indicate one or more performance goals 422 to the parallel processing framework, and the parallel processing framework may consider the performance goals 422 when selecting the hardware processors 418 for execution of the various tools 414 of the specified pipeline 412. The performance goals 422 may indicate allowable latencies of the pipeline 412 or of individual tools 414 of the pipeline 412. The performance goals 422 may also indicate types of processing involved by each of the tools 414.

Figure 5:
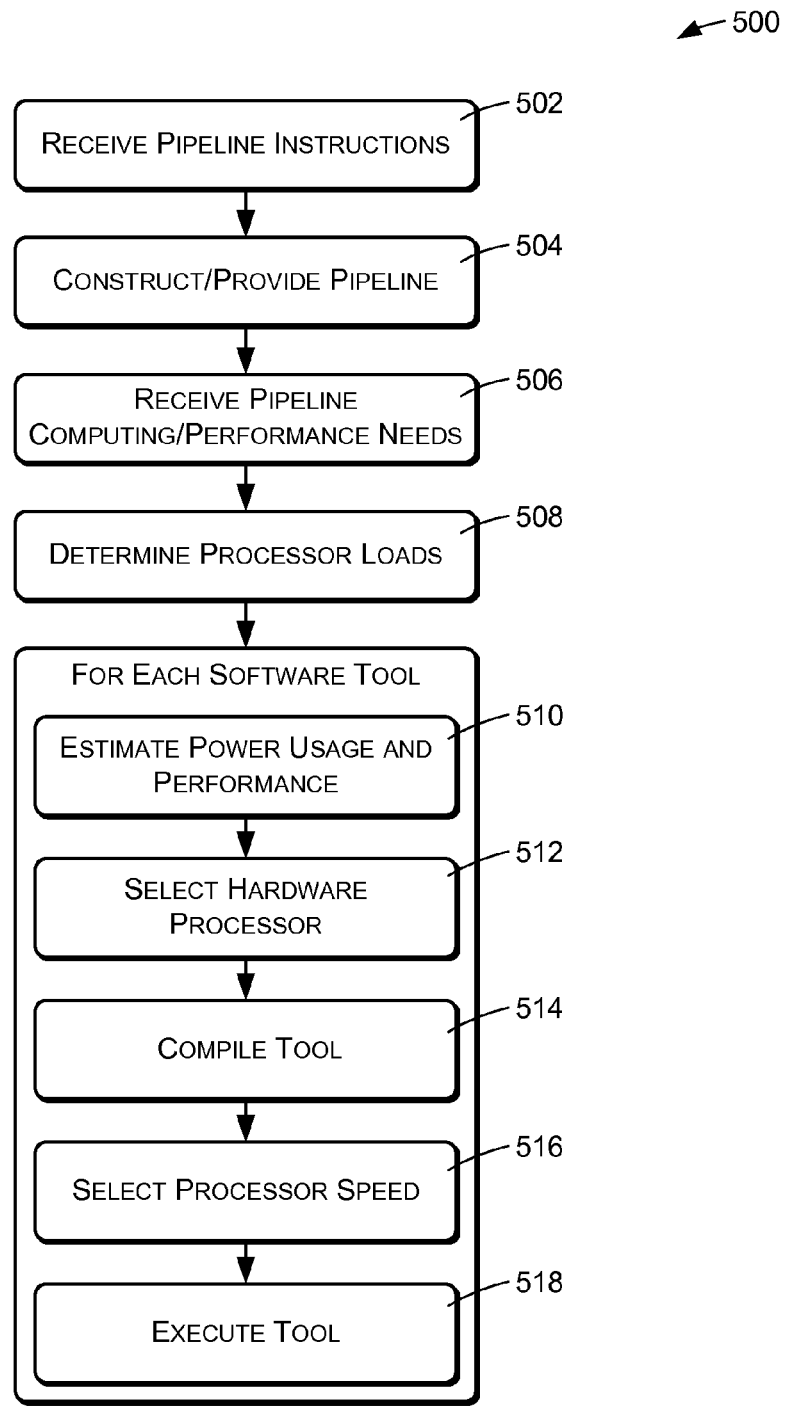
FIG. 5 is a flow diagram illustrating an example method of dynamically selecting hardware processors for execution of pipeline tools in a computing platform.

FIG. 5 illustrates an example method 500 of implementing and executing stream processing pipelines on a heterogeneous computing platform such as an SoC that includes multiple hardware processors such as general-purpose central-processing units, processor cores, graphics processing units, digital signal processors, processor extensions, vector processors etc. The method 500 may be performed in conjunction with the architecture and configuration discussed above or in other environments.

An action 502 comprises receiving instructions from an application regarding a processing pipeline, such as instructions to execute a specified processing pipeline. The instructions may identify or specify one of multiple processing pipelines that are preconfigured and provided by the computing platform. Alternatively, the instructions may specify or provide a configuration of a custom processing pipeline.

The specified processing pipeline comprises a sequence of multiple stream processing tools. Each stream processing tool may be a tool that is provide by the computing platform or a tool that is provided as a software module by the application.

The instructions provided by the application may include one or more commands that identify individual stream processing tools of the processing pipeline and that further identify a sequential configuration of the tools of the processing pipeline. The commands may provide further configuration information such as information regarding data providers and data consumers.

Each stream processing tool may comprise a software component that implements a function, method, or algorithm. For example, each stream processing tool may be provided as a program or routine written in a hardware agnostic programming language. Each stream processing tool may invoke kernel functions of the computing platform, including low-level device and processor drivers as well as function libraries that may be provided by the computing platform. In some cases, one or more stream processing tools may be provided as part of the computing platform. In addition, one or more stream processing tools may be specified and/or provided by the application.

Each stream processing tool is configured to be executed by each of multiple available hardware processors of the computing system. For example, a stream processing tool may be written or provided in a high-level or intermediate-level language that calls functions supported by the computing platform but that is not dependent on hardware features of the computing system. At runtime, prior to execution, the stream processing tool may be compiled for a specific hardware processor. Alternatively, the computing platform may be configured to have multiple pre-compiled versions of each stream processing tool, wherein each version is suitable for execution by a different available hardware processor.

An action 504 may comprise constructing and/or providing a processing pipeline in response to the instructions or commands received from the application. For example, the application may identify multiple software tools provided by a library of software tools and may specify an order in which the software tools are to be sequenced. The application may specify parameters or arguments for the tools and may specify data sources and data sinks. The computing platform may respond by instantiating the identified tools for operation in the specified sequence on a data stream received from the specified data source.

An action 506 may comprise receiving one or more performance goals that are to be associated with the pipeline or individual stream processing tools of the pipeline. The one or more performance goals may indicate an allowable execution latency of each processing tool of the processing pipeline. The one or more performance goals may in some cases also indicate whether the pipeline is to execute continuously and/or a priority at which the pipeline or its stream processing tools are to execute. In some cases, the performance goals may indicate a minimum computational accuracy to be achieved by the stream processing tools of the pipeline.

An action 508 comprises determining available capabilities and/or capacities of the multiple hardware processors. In some cases, this may comprise determining existing processor loads and/or power consumption of each of the multiple hardware processors.

Remaining actions of FIG. 5 are performed with respect to each of the individual stream processing tools of the processing pipeline. An action 510 comprises estimating power consumed by each hardware processor to execute the individual stream processing tool. The action 510 may also comprise estimating the latency required or introduced by each hardware processor when it is called upon to execute the individual stream processing tool. In some cases, these actions may be based on observations during previous executions of the individual stream processing tool by different hardware processors. The action 510 may comprise determining whether or not a particular hardware processor is currently capable of executing the individual stream processing tool within no more than the allowable latency that has been indicated by the performance goals for the individual stream processing tool.

An action 512 comprises selecting one of the hardware processors to execute the individual stream processing tool, wherein the selected one of the hardware processors has available capacities or capabilities that satisfy the performance needs or goals of the individual stream processing tool. In some cases the action 512 is based at least in part on characteristics of the hardware processors such as speeds, power consumption, and power versus latency estimations. In some cases the action 512 may be based at least in part on current processing loads of the processors. In some cases, the selection of the hardware processor may be based on the estimated or projected performance of the hardware processor in comparison to the estimated or projected power usage of the hardware processor when executing the individual stream processing tool. In some cases, selecting the hardware processor to execute the individual stream processing component may comprise determining that the hardware processor has available capacity or capabilities that will provide the computing needs indicated by the application with respect to the pipeline. The hardware processor may also be selected based on a desired priority of the pipeline as indicated by the application and/or on the type of processing required of by the individual processing tool.

As a specific example, the action 510 may comprise determining which of the multiple available hardware processors are capable of executing the individual stream processing tool with no more than the allowable latency. The action 510 may further comprise determining which of these hardware processors uses the least power when executing the individual stream processing tool. The action 512 may comprise selecting the hardware processor that is capable of executing the individual stream processing tool while using the least comparative amount of power.

An action 514 comprises compiling the individual stream processing tool to create an instruction sequence for execution by the selected hardware processor. In some cases, stream processing tools may be pre-compiled for different hardware processors. In other cases, the individual stream processing tool may be compiled after or in response to selecting the hardware processor, so that the individual stream processing tool may be compiled for the specific processor upon which it will be executed. Runtime compiling such as this may be particularly useful for stream processing tools that are provided by the application at runtime.

An action 516 comprises selecting a processor speed or clock speed of the selected hardware processor such that the hardware processor is able to satisfy the performance needs of the individual stream processing tool for which the hardware processor has been selected to execute. Note that in some cases, the clock speed may be selected to accommodate multiple processes that are being executed concurrently by the hardware processor.

An action 518 comprises executing the individual stream processing tool on the selected hardware processor, using the selected clock speed.

The example method 500 allows an application to utilize the various hardware resources of a computing platform without being dependent upon the particular hardware resources that are provided by the computing platform. Rather, the application may be written with reference to standard libraries of functions, tools, and pipelines.

Furthermore, the resource management features utilized by the described techniques allow the computing platform to reduce its power consumption while still providing adequate levels of performance.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing platform comprising:
   multiple hardware processors;
   multiple image processing tools, the multiple image processing tools including a first image processing tool that is executable by an individual hardware processor of the multiple hardware processors;
   an image processing pipeline configured to receive an image data stream and to process the image data stream with a sequence of the multiple image processing tools;
   a resource manager configured to receive from an application (a) an instruction to execute the image processing pipeline and (b) a first performance goal that indicates an allowable latency of the first image processing tool;
   the resource manager being further configured to perform acts based at least in part on receiving the instruction from the application, the acts comprising:
   determining that a first hardware processor of the multiple hardware processors is configured to execute the first image processing tool with no more than the allowable latency;
   determining that a second hardware processor of the multiple processors is configured to execute the first image processing tool with no more than the allowable latency;
   determining that executing the first image processing tool on the first hardware processor uses less power than executing the first image processing tool on the second hardware processor; and
   selecting the first hardware processor to execute the first image processing tool.

2. The computing platform of claim 1, wherein the selecting the first hardware processor is based at least on part on one or more of:
   an available capacity of the first hardware processor;
   a priority of the image processing pipeline relative to a second image processing pipeline; or
   whether the image processing pipeline executes continuously.

3. The computing platform of claim 1, the acts further comprising:
   receiving a second performance goal for the image processing tool from the application;
   determining that the first hardware processor is configured to satisfy the second performance goal when executing the first image processing tool;
   determining that the second hardware processor is configured to satisfy the second performance goal when executing the first image processing tool;
   wherein second performance goal indicates one or more of:
      whether the image processing pipeline executes continuously; or
      a priority of the image processing pipeline relative to a second image processing pipeline.

4. A method, comprising:
   receiving an instruction from an application to execute a processing pipeline, wherein the processing pipeline comprises multiple stream processing tools;
   receiving an indication of a performance goal from the application, the performance goal indicating an allowable latency for a stream processing tool of the multiple stream processing tools;
   determining that a first hardware processor is configured to execute the stream processing tool with no more than the allowable latency;
   determining that a second hardware processor is configured to execute the stream processing tool with no more than the allowable latency;
   determining that executing the stream processing tool on the first hardware processor uses less power than executing the stream processing tool on the second hardware processor; and
   selecting the first hardware processor to execute the stream processing tool.

5. The method of claim 4, wherein selecting the first hardware processor comprises selecting the first hardware processor based at least on one or more of:
   available capacity of the first hardware processor;
   priority of the processing pipeline;
   whether the processing pipeline executes continuously;
   execution latency of the first hardware processor; or
   power usage of the first hardware processor.

6. The method of claim 4, wherein the performance goal further indicates one or more of:
   whether the processing pipeline executes continuously; or
   priority of the processing pipeline relative to another processing pipeline.

7. The method of claim 4, further comprising compiling the stream processing tool to create an executable instruction sequence for execution by the first hardware processor, wherein compiling the stream processing tool is performed in response to selecting the first hardware processor.

8. The method of claim 4, further comprising receiving, from the application, one or more commands that specify the multiple stream processing tools of the processing pipeline.

9. The method of claim 4, wherein selecting the first hardware processor comprises selecting the first hardware processor based at least in part on projected performance of the first hardware processor when executing the stream processing tool in comparison to projected power usage of the first hardware processor when executing the stream processing tool.

10. The method of claim 4, further comprising determining a current processing load of the first hardware processor, wherein selecting the first hardware processor is based at least in part on the current processing load of the first hardware processor.

11. The method of claim 4, further comprising selecting a clock speed of the first hardware processor based at least on the performance goal.

12. The method of claim 4, wherein the first hardware processor comprises:
   a general-purposes central-processing unit;
   a processor core;
   a graphics processing unit;
   a digital signal processor;
   a processor extension; or
   a vector processor.

13. A computing platform comprising:
   a first hardware processor;
   a second hardware processor;

a resource manager configured to perform acts comprising:
receiving an instruction from an application to execute a processing pipeline, wherein the processing pipeline comprises multiple stream processing tools:
receiving an indication of a performance goal from the application, the performance goal indicating an allowable latency for a stream processing tool of the multiple stream processing tools;
determining that the first hardware processor is configured to execute the stream processing tool with no more than the allowable latency;
determining that the second hardware processor is configured to execute the stream processing tool with no more than the allowable latency;
determining that executing the stream processing tool on the first hardware processor uses less power than executing the stream processing tool on the second hardware processor; and
selecting the first hardware processor to execute the stream processing tool,
determining that executing the stream processing tool on the first hardware processor uses less power than executing the stream processing tool on the second hardware processor; and
selecting the first hardware processor to execute the stream processing tool.

14. The computing platform of claim 13, wherein selecting the first hardware processor is based at least on part on one or more of:
available capacity of the first hardware processor;
priority of the processing pipeline;
whether the processing pipeline executes continuously;
execution latency of the first hardware processor;
power usage of the first hardware processor; or
an allowable latency of the processing pipeline.

15. The computing platform of claim 13, wherein the performance goal further indicates one or more of:
whether the processing pipeline executes continuously; or
priority of the processing pipeline relative to another processing pipeline.

16. The computing platform of claim 13, the acts further comprising compiling the stream processing tool to create an executable instruction sequence for execution by the first hardware processor, wherein compiling the stream processing tool is performed in response to selecting the first hardware processor.

17. The computing platform of claim 13, wherein selecting the first hardware processor is based at least in part on projected performance of the first hardware processor when executing the stream processing tool in comparison to projected power usage of the first hardware processor when executing the stream processing tool.

18. The computing platform of claim 13, the acts further comprising:
determining a current processing load of the first hardware processor; and
wherein selecting the first hardware processor is based at least in part on the current processing load of the first hardware processor.

19. The computing platform of claim 13, the acts further comprising selecting a clock speed of the first hardware processor based at least on the performance goal.

20. The computing platform of claim 13, wherein the first hardware processor comprises:
a general-purposes central-processing unit;
a processor core;
a graphics processing unit;
a digital signal processor;
a processor extension; or
a vector processor.

* * * * *